United States Patent
Simon et al.

(10) Patent No.: US 9,796,859 B2
(45) Date of Patent: *Oct. 24, 2017

(54) INSULATION LAYER-FORMING COMPOSITION AND USE THEREOF

(71) Applicant: Hilti Aktiengesellschaft, Schaan (LI)

(72) Inventors: Sebastian Simon, Buchloe Lindenberg (DE); Frank Thiemann, Landsberg/Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

This patent is subject to a terminal disclaimer.

(21) Appl. No.: 15/104,806

(22) PCT Filed: Dec. 12, 2014

(86) PCT No.: PCT/EP2014/077526
§ 371 (c)(1),
(2) Date: Jun. 15, 2016

(87) PCT Pub. No.: WO2015/091251
PCT Pub. Date: Jun. 25, 2015

(65) Prior Publication Data
US 2016/0312042 A1    Oct. 27, 2016

(30) Foreign Application Priority Data
Dec. 16, 2013  (EP) .................... 13197465

(51) Int. Cl.
| | | |
|---|---|---|
| C08G 63/02 | (2006.01) | |
| C09D 5/18 | (2006.01) | |
| C09D 4/00 | (2006.01) | |
| C08G 63/00 | (2006.01) | |
| C08K 13/02 | (2006.01) | |

(52) U.S. Cl.
CPC ............. C09D 5/185 (2013.01); C09D 4/00 (2013.01); C08K 13/02 (2013.01)

(58) Field of Classification Search
CPC .................................................. C09D 5/185
USPC ........................................................ 523/179
See application file for complete search history.

(56) References Cited

U.S. PATENT DOCUMENTS

| | | |
|---|---|---|
| 3,562,197 A | 2/1971 | Sears |
| 3,969,291 A | 7/1976 | Fukuba et al. |
| 4,442,157 A | 4/1984 | Marx |
| 5,869,732 A | 2/1999 | Nishikawa et al. |
| 7,479,513 B2 | 1/2009 | Reinheimer et al. |
| 8,560,208 B2 | 10/2013 | Miyamoto et al. |
| 2016/0068689 A1* | 3/2016 | Lang .................... C08K 3/22 523/179 |

FOREIGN PATENT DOCUMENTS

| | | |
|---|---|---|
| DE | 102006025670 | 12/2006 |
| EP | 138 546 A1 | 4/1985 |
| EP | 139 401 A1 | 5/1985 |
| EP | 0287829 | 10/1988 |
| EP | 0477840 | 4/1992 |
| EP | 1462501 A1 | 9/2004 |
| EP | 1489136 A1 | 12/2004 |
| GB | 755 551 A | 8/1956 |
| GB | 2 007 689 A1 | 5/1979 |
| GB | 2428242 | 1/2007 |
| WO | WO 2010/030771 A1 | 3/2010 |
| WO | WO 2011/055463 | 5/2011 |
| WO | WO 2011/124663 | 10/2011 |
| WO | WO2013/050623 | 4/2013 |
| WO | WO2014/154729 | 10/2014 |

OTHER PUBLICATIONS

M. Fabris, V. Lucchini, M. Noe, A. Perosa, M. Selva: "Ionic Liquids Made with Dimethyl Carbonate: Solvents as well as Boosted Basic Catalysts for the Michael Reaction," Chem. Eur. J. Oct. 6, 2009, 15, 12273-12282.

M. Fabris, M. Noe, A. Perosa, M. Selva, R. Ballini: "Methylcarbonate and Bicarbonate Phosphonium Salts as Catalysts for the Nitroaldol (Henry) Reaction," J. Org. Chem. Jan. 17, 2012, 77, 1805-1811.

S. V Levchik, E. D Weil: "Review Thermal decomposition, combustion and flame-retardancy of epoxy resins—a review of the recent literature," Polym. Int., Oct. 13, 2004, 53, 1901-1929.

E. Diez-Barra, A. de la Hoz, S. Merino, A. Rodriguez, P. Sánchez-Verdú: "Transfer Catalysed Michael Addition.," Tetrahedron Nov. 27, 1997, 54, 1835-1844.

J. W. Chan, C. E. Hoyle, A. B. Lowe, M. Bowman, Nucleophile-Initiated Thiol-Michael Reactions: Effect of Organocatalyst, Thiol, and Ene, Macromolecules, Jul. 14, 2010, 43, 6381-6388.

* cited by examiner

Primary Examiner — Terressa Boykin
(74) Attorney, Agent, or Firm — Davidson, Davidson & Kappel, LLC

(57) ABSTRACT

Described is an insulation layer-forming composition containing a binder that is based on a compound having low-electron multiple carbon bonds and a carbanion-forming compound. The disclosed composition, which has a relatively high expansion rate, makes it possible to apply, in a simple and rapid manner, coatings that have the layer thickness required for the particular fire resistance time, the layer thickness being reduced to a minimum while achieving a great insulating effect. The disclosed composition is particularly suitable for fire protection, especially as a coating for steel components such as pillars, beams and truss members, for increasing the fire resistance time.

23 Claims, No Drawings

INSULATION LAYER-FORMING COMPOSITION AND USE THEREOF

The present invention relates to an insulation layer-forming composition, in particular, a composition having intumescent properties, which contains a binder on the basis of a compound having electron-deficient multiple carbon bonds and a carbanion-forming bond, as well as its use for fire protection, in particular, for coating components, such as pillars, beams, or truss members in order to enhance their fire resistance.

BACKGROUND

Insulation layer-forming compositions, also known as intumescent compositions, are customarily used to form coatings on the surface of building components in order to protect them against fire or against the effects of great heat, for example, as a result of a fire. Steel constructions are an integral part of modern architecture, even when they have a clear disadvantage compared to reinforced concrete. Above approximately 500° C., the load-bearing capacity of steel is reduced by 50%, i.e., steel loses most of its stability and its load-bearing capacity. This temperature may be reached, depending on the exposure to fire, for example, in the event of direct effect of fire (approximately 1000° C.) as rapidly as after 5 to 10 minutes, which often results in loss of load-bearing capacity of the construction. The objective of fire protection, in particular, of steel fire protection, is now to delay the loss of load-bearing capacity of a steel construction as long as possible in the event of a fire to save human lives and valuable objects.

For this reason, the construction regulations of many countries require specific fire resistance times of certain steel constructions. They are defined by so-called F classes such as F 30, F 60, F 90 (fire resistance classes according to DIN 4102-2) or U.S. classes according to ASTM, etc. For example, in DIN 4102-2, F 30, for example, means that, under standard conditions, a supporting steel structure must withstand fire for at least 30 minutes. This is customarily achieved by delaying the heating rate of steel, for example, by coating the steel construction using insulation layer-forming coatings. These are coatings whose components form a solid microporous carbon foam in the event of a fire. A thick foam layer having fine pores, known as ash crust, is then formed, which, depending on its composition, is highly heat-insulating, thus delaying the heating-up of the building component, so that the critical temperature of approximately 500° C. is not reached within 30, 60, 90, or 120 minutes, or up to 240 minutes. The layer thickness of the coat applied, i.e., the ash crust formed therefrom, is always important for the achievable fire-resistance. Closed profiles such as pipes, require approximately twice the amount of open profiles such as beams having a double T profile for a comparable mass. In order to comply with the required fire resistance times, the coatings must have a certain thickness and must be capable of forming, at impact of heat, an ash crust that is preferably voluminous and thus a good insulator, and that remains mechanically stable during the time of fire exposure.

Different systems exist in the prior art for this purpose. A difference is made basically between 100% systems and solvent-based or water-based systems. In solvent-based or water-based systems, binders, mostly resins, are applied to the building component as a solution, dispersion, or emulsion. These may be designed as single-component or multicomponent systems. After application, the solvent or water evaporates, leaving a film, which eventually dries. A distinction may be made between systems in which the coating is essentially no longer modified during drying, and systems in which, after evaporation, the binder cures primarily via oxidation or polymerization reactions induced, for example, by atmospheric oxygen. 100% systems contain the components of the binder without a solvent or water. They are applied to the building component, and "drying" of the coating takes place via reaction of the binder components with each other and/or via reaction with components of the ambient air, such as water.

Solvent-based or water-based systems have the disadvantage that drying times, also referred to as curing times, are long and also multiple layers must be applied, i.e., they require multiple operations to achieve the required layer thickness. Since each individual layer must dry before the next layer is applied, this results in long operating times and, therefore, high costs and delay in finishing the construction, since, depending on the climatic conditions, several days may pass before the required layer thickness is applied. It is also disadvantageous that, due to the required layer thickness, the coating may tend to form cracks and to flake during drying or impact of heat, whereby, in the worst case, the substrate may be partially exposed, in particular, in systems in which the binder is not post-cured after the solvent or water is evaporated.

In order to circumvent these disadvantages, epoxy-amine based two-component or multicomponent systems have been developed, which work almost without a solvent, so that curing occurs considerably faster and thicker layers may be applied in a single operation, so that the required layer thickness is built up substantially faster. However, they have the disadvantage that the binder forms a very stable and rigid polymer matrix often having an extended softening range, which hinders foam formation by the foaming agent. Therefore, thick layers must be applied in order to achieve sufficient foam thickness for insulation. This in turn is disadvantageous, since it requires large quantities of material. In order to make it possible to apply these systems, processing temperatures of up to +70° C. are often required, which makes these systems labor-intensive and expensive to install. Furthermore, some of the binder components used, such as amines or amine mixtures used in epoxy-amine systems, are toxic or otherwise critical (for example, irritating or corrosive).

In the area of decorative and protective coatings, the Michael addition is known as a curing mechanism. The reaction is customarily catalyzed by strong bases such as, for example, an amidine base. However, in formulations based on polymers, such as polyesters, which have hydrolytically cleavable bonds, it is disadvantageous that the coatings have reduced stability against hydrolysis. WO 2010/030771 A1, for example, describes a method for applying a curable composition onto a substrate, where curing takes place via Michael addition of a compound containing active hydrogen atoms to polyenes in the presence of a phosphine catalyst. Also in the area of adhesives, the Michael addition is known as a curing mechanism, as described, for example, in EP 1462501 A1.

SUMMARY OF THE INVENTION

However, no fire protection coating on this basis, containing fire protection additives, is known. The maximum allowable proportion of fire protection additives is also not known.

It is an object of the present invention to provide an insulation layer-forming composition of the type mentioned at the outset, which avoids the above-mentioned disadvantages, which is not solvent-based or water-based in particular, cures rapidly, may be easily applied due to its properly adjusted viscosity, and requires only a reduced layer thickness due to the high achievable intumescence, i.e., formation of an effective ash crust layer.

A further disadvantage of the known systems is that the reactivity of the binder components determines the processing time of the compositions. Furthermore, there are additional requirements for the coating systems, such as influencing the curing time (curing profile) without negatively affecting the curing process itself, i.e., the reactivity of the binder components, or influencing the properties of the surface of the cured coating, which cannot be achieved using the known compositions. These requirements are, however, contradictory in some way. For quick curing, but also to achieve robustness against acid contaminants, reactive binder components and/or high catalyst concentrations are required. On the other hand, high catalyst concentrations may negatively affect the surface properties and the hardness of the coating. WO 2013/050623 A1 describes a Michael addition system, containing, a Michael donor and a Michael acceptor, an additional Michael donor, whose reactivity differs from that of the actual Michael donor, as an inhibitor for adjusting the reactivity profile of the Michael addition system.

This system, however, has no fire protection properties, so it cannot be used as fire protection coating.

Another alternate or additional object of the present invention is to provide an insulation layer-forming composition system of the type mentioned at the outset, whose reactivity is adjustable, so that an open time becomes adjustable, and the coating system may be adapted to different processing conditions.

The present invention provides an insulation layer-forming composition including a component A, which contains a multifunctional Michael acceptor, which has at least two electron-deficient multiple carbon bonds per molecule as functional Michael acceptor groups;
a component B, which contains a multifunctional Michael donor having at least two C,H acid groups per molecule as Michael donor groups;
a component C, which contains a compound having an X—H group, this compound being capable of reacting with component A, and where X stands for N, P, O, S, or C with the provision that when X stands for C, C is part of an acid methyl group;
a component D, which contains a catalyst for a Michael addition reaction; and
a component E, which contains an insulation layer-forming additive.

Using the composition according to the present invention, coatings having the required layer thickness for the particular fire resistance period may be easily and rapidly applied, the processing time being easily adjustable. The advantages achieved by the present invention are essentially that, compared to solvent-based or water-based systems having inherently slow curing times, the processing time may be substantially reduced. Due to the low viscosity of the composition in the range of application, adjusted via suitable thickening systems, unlike epoxy-amine systems, they may be applied, for example, using the widely used airless spray method, without heating the composition Another advantage is that health-endangering substances and substances subject to labeling, such as critical amine compounds, for example, may be largely or completely avoided.

Due to the lower softening range of the polymer matrix, compared to epoxy-amine based systems, intumescence regarding the expansion rate is relatively high, so that a high insulating effect may be achieved even using thin layers. The high degree of filling of the composition having fire protection additives, which may be achieved even without using volatile solvents, also contributes to this effect. Accordingly, material use is reduced, which has a beneficial effect on material costs, in particular when the composition is applied to large surfaces. This is achieved, in particular, by using a reactive system that does not dry physically, but rather cures chemically via an additive reaction. The compositions are thus not subject to volume loss due to drying of solvents or, in water-based systems, of water. Thus, in traditional systems, a solvent content of 25% is typical. This means that out of a 10 mm wet film layer, only 7.5 mm remain as an actual protective layer on the substrate to be protected. In the composition according to the present invention, more than 95% of the coating remains on the substrate to be protected. In the event of fire, the composition according to the present invention forms a very hard and stable ash crust, even without the addition of a large proportion of ash crust stabilizers. The compositions according to the present invention have excellent adhesion to steel, cohesion and impact resistance compared with solvent-based or water-based systems when these are applied without a primer.

For better understanding of the present invention, the following explanations of the terminology used here are considered useful. As used in connection with the invention, a "Michael addition" is, in general, a reaction between a Michael donor and a Michael acceptor, often in the presence of a catalyst, such as a strong base; the Michael addition is sufficiently known and often described in the literature;

a "Michael acceptor" is a compound having at least one C—C double bond or a C—C triple bond, which is not aromatic and is electron-deficient; the Michael acceptor is composed of a functional Michael acceptor group and a skeleton;

a "functional Michael acceptor group" is the group in the Michael acceptor, which includes a functional group, more precisely an electron-withdrawing group and, in an a position thereto, the C—C double bond or C—C triple bond, to which the Michael donor adds; the electron-deficient C—C double bond or C—C triple bond is known as Michael-active multiple carbon bond; the functional Michael acceptor group is connected to the skeleton or included therein; a Michael acceptor may have one or more separate functional Michael acceptor groups; each functional Michael acceptor group may have one Michael-active multiple carbon bond; the total number of Michael-active multiple carbon bonds in the molecule corresponds to the functionality of the Michael acceptor;

a "multifunctional Michael acceptor" is a compound, which has two or more functional Michael acceptor groups or Michael-active multiple carbon bonds;

"electron-deficient" means that the multiple carbon bond carries electron-withdrawing groups in the immediate vicinity, i.e., usually on the carbon atom next to the multiple carbon bond, which draw electron density from the multiple carbon bond, for example, C=O;

a "Michael donor" is a C,H acid compound, i.e., a compound having at least one acid C,H bond, capable of forming at least one carbanion capable of adding to the Michael acceptor; the acid hydrogen atom is also known as Michel-active hydrogen atom; the Michael donor is composed of the functional Michael donor group and a skeleton;

a "functional Michael donor group" is the group in the Michael donor, which includes a functional group and, in α position thereto, the carbon atom, from which the carbanion is formed; the functional Michael donor group is connected to the skeleton; a Michael donor may have one or more separate functional Michael donor groups; each functional Michael donor group may have a Michael-active hydrogen atom; the total number of Michael-active hydrogen atoms in the molecule corresponds to the functionality of the Michael donor;

a "multifunctional Michael donor" is a compound that has two or more functional Michael donor groups or Michael-active hydrogen atoms;

the "skeleton" is the part of the donor or acceptor molecule to which the functional Michael donor group or the functional Michael acceptor group is connected;

"chemical intumescence" means the formation of a voluminous insulating ash layer by compounds adjusted to each other, which react with each other at impact of heat;

"physical intumescence" means the formation of a voluminous insulating layer by the swelling of a compound which, without a chemical reaction between two compounds having taken place, releases gases at impact of heat, whereby the volume of the compound increases by a multiple of the original volume;

"insulation layer-forming" means that, in the event of a fire, a solid microporous carbon foam is created, so that the finely porous and thick foam layer formed, known as ash crust, insulates a substrate against heat, depending on its composition;

a "carbon source" is an organic compound which leaves a carbon skeleton by incomplete combustion and does not burn completely to form carbon dioxide and water (carbonization); these compounds are also known as "carbon skeleton builders,"

an "acidifier" is a compound which, at impact of heat, i.e., above approximately 150° C., forms a non-volatile acid, for example, by decomposition, and thus acts as a catalyst for carbonization; in addition, it may contribute to the reduction in the viscosity of the binder melt; therefore, the term "dehydration catalyst" is used as a synonym;

a "propellant" is a compound which, at elevated temperatures, decomposes releasing inert, i.e., non-combustible gases and which swells the carbon skeleton formed by carbonization and, possibly, the softened binder, to a foam (intumescence); the term "gas producer" is used as a synonym;

an "ash crust stabilizer" is a skeleton-forming compound that stabilizes the carbon skeleton (ash crust) formed from the joint action of carbon production from the carbon source and the gas from the propellant or from the physical intumescence; the effect is based on the principle that the very soft carbon layers formed are mechanically reinforced by inorganic compounds; the addition of such an ash crust stabilizer contributes to substantially stabilizing the intumescence crust in the event of fire, since these additives increase the mechanical strength of the intumescent layer and/or prevent them from dripping off, "(meth)acryl" means that both "(meth)acryl" and "acryl" compounds are to be included;

an "oligomer" is a molecule having 2 to 5 repeat units, and a "polymer" is a molecule having 6 or more repeat units, and may have linear, branched, star-shaped, helical, hyperbranched, or cross-linked structures; in general, polymers may have a single type of repeat units ("homopolymers") or may have more than one type of repeat units ("copolymers"). As used herein, "resin" is a synonym for polymer.

In general, it is assumed that by reacting a Michael donor having a functionality of two with a Michael acceptor having a functionality of two will result in linear molecular structures. Often molecular structures that are branched and/or cross-linked must be produced, which requires the use of at least one reagent having a functionality greater than two. Therefore, the multifunctional Michael donor or the multifunctional Michael acceptor or both have preferably a functionality greater than two.

Advantageously, a compound having at least two electron-deficient multiple carbon bonds, such as C—C double bonds or C—C triple bonds, preferably C—C double bonds per molecule is used as a functional Michael acceptor group.

According to one specific embodiment of the present invention, the Michael acceptor is a compound having at least one functional Michael acceptor group having structure (I) or (II).

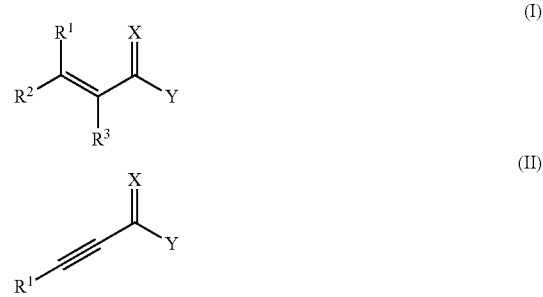

where $R^1$, $R^2$, and $R^3$ are, independently of one another, hydrogen or organic radicals such as linear, branched or cyclic, possibly substituted alkyl groups, aryl groups, aralkyl groups (also known as aryl-substituted alkyl groups), or alkaryl groups (also known as alkyl-substituted aryl groups), including derivatives and substituted versions thereof; they may, independently of each other, contain additional ether groups, carboxyl groups, carbonyl groups, thiol analog groups, nitrogen-containing groups, or combinations thereof; X represents oxygen, sulfur, or $NR^4$, where $R^4$ represents hydrogen or any of the organic groups such as described above for $R^1$, $R^2$, and $R^3$. —Y represents $OR^5$, $SR^5$ or $NR^5R^6$, wherein $R^5$ represents hydrogen or any of the organic groups as described above for $R^1$, $R^2$, and $R^3$.

The functional Michael acceptor group is preferably a group having the structure (III):

where $R^1$, $R^2$, and $R^3$ are as described above, and Y represents $OR^5$ or $NR^5R^6$, $R^5$ and $R^6$ being as described above.

Each functional Michael acceptor group may be directly connected to another Michael acceptor group or a skeleton via one or more of $R^1$, $R^2$, $R^3$, $R^4$, $R^5$, or $R^3$.

Any C,H acid compound having at least two functional Michael donor groups and capable of forming carbanions, in particular, enolate anions, which may add to electron-deficient double bonds in a Michael reaction, may be used as a Michael donor. A functional Michael donor group has at least one acid CH bond. A difunctional Michael donor having two functional Michael donor groups, each of which has an acid CH bond, thus has two acid CH bonds per molecule. A trifunctional Michael donor may have three functional Michael donor groups each having only one acid CH bond, or it may have two functional Michael donor groups, of which one group has only one, and the second group has two acid CH groups. The carbanion is usually not released until the Michael-active hydrogen atom is split off by a suitable, stoichiometrically or catalytically active base.

The Michael-active hydrogen atom is advantageously connected to a carbon atom situated between two electron-withdrawing groups such as C=O.

Examples of suitable functional Michael donor groups include β-ketoesters, 1,3-diketones, malonic esters and malonic ester derivatives such as malonamides and β-ketoamides (where the Michael-active hydrogen atom is connected to a carbon atom located between the carbonyl groups), cyanoacetate esters and cyanoacetamides (where the Michael-active hydrogen atom is connected to a carbon atom located between a carbonyl group and a cyano group), and α-nitroalkanes.

Each functional Michael donor group may, similarly to the Michael acceptor group, be connected to another functional Michael donor group or directly to a skeleton.

The multifunctional Michael acceptor and/or the multifunctional Michael donor of the present invention may have one of a plurality of skeletons, which may be identical or different.

In some specific embodiments of the present invention, the skeleton of the multifunctional Michael donor or of the multifunctional Michael acceptor or both is a monomer, an oligomer, or a polymer.

Preferred skeletons of the multifunctional Michael acceptors have a molecular weight (Mw) of 5,000 or less, more advantageously 2,000 or less, and most advantageously 1,000 or less.

Preferred skeletons of the multifunctional Michael donors have a molecular weight (Mw) of 200 or more.

The following may be named as examples of polymers: polyalkylene oxide, polyurethane, polyethylenevinyl acetate, polyvinyl alcohol, polydiene, hydrated polydiene, alkyde, alkyde polyester, (meth)acryl polymer, polyolefin, polyester, halogenated polyolefin, halogenated polyester, as well as copolymers or mixtures thereof.

In some specific embodiments of the invention one or more polyol compound(s), i.e., one or more polyvalent alcohol(s) is/are used as at least one skeleton. Some polyvalent alcohols that are suitable as skeletons either for the multifunctional Michael acceptor or the multifunctional Michael donor include, for example, alkanediols, alkylene glycols such as ethylene glycol, propylene glycol, glyceroles, sugar, pentaerythritols, polyvalent derivatives or mixtures thereof. Examples of polyvalent alcohols that are suitable as skeletons include neopentyl glycol, trimethyl propane, ethylene glycol and polyethylene glycol, propylene glycol and polypropylene glycol, butanediol, pentanediol, hexanediol, tricyclodecanedimethylol, 2,2,4-trimethyl-1,3-pentanediol, bisphenol A, cyclohexanedi methanol, alkoxylated and/or propoxylated derivatives of neopentyl glycol and tetraethylene glycol cyclohexanedimethanol, hexanediol, castor oil, and trimethylolpropane.

In one preferred specific embodiment, structure (III) is connected to a polyol compound by an ester bond via $R_4$, the polyol compound being as defined above.

Some suitable multifunctional Michael acceptors in the present invention include, for example, molecules in which some or all structures (II) are (meth)acrylic acid, fumaric acid, or maleic acid radicals, substituted versions or combinations thereof, which are connected to the multifunctional Michael acceptor molecule via an ester bond. A compound having structures (II), which include two or more (meth)acrylic acid radicals are referred herein as "polyfunctional (meth)acrylate." Polyfunctional (meth)acrylates having at least two double bonds, which may act as acceptors in the Michael addition, are preferred.

Examples of suitable di(meth)acrylates include, without being restricted to, ethylene glycol di(meth)acrylate, propylene glycol-di(meth)acrylate, diethylene glycol di(meth)acrylate, dipropylene glycol di(meth)acrylate, triethylene glycol di(meth)acrylate, tripropylene glycol di(meth)acrylate, tetraethylene glycol di(meth)acrylate, tetrapropylene glycol di(meth)acrylate, polyethylene glycol di(meth)acrylate, polypropylene glycol di(meth)acrylate, mono- and poly-ethoxylated bisphenol A-di(meth)acrylate, bisphenol A diglycidylether-di(meth)acrylate, resorcinoldiglycidylether-di(meth)acrylate, 1,3-propanediol-di(meth)acrylate, 1,4-butanediol-di(meth)acrylate, 1,5-pentanediol-di(meth)acrylate, 1,6-hexanediol-di(meth)acrylate, neopentyl glycol di(meth)acrylate, cyclohexanedimethanol-di(meth)acrylate, mono- and polyethoxylated neopentyl glycol-di(meth)acrylate, mono- and poly-propoxylated neopentyl glycol-di(meth)acrylate, mono- and polyethoxylated cyclohexanedimethanol-di(meth)acrylate, propoxylated cyclohexanedimethanol-di(meth)acrylate, arylurethane-di(meth)acrylate, aliphatic urethane-di(meth)acrylate, polyester-di(meth)acrylate, and mixtures thereof.

Examples of suitable tri(meth)acrylates include, without being restricted to trimethylolpropane-tri(meth)acrylate, trifunctional (meth)acrylic acid-s-triazine, glycerol tri(meth)acrylate, mono- and polyethoxylated trimethylolpropane tri(meth)acrylate, mono- or polypropoxylated trimethylolpropane tri(meth)acrylate, tris(2-hydroxyethyl) isocyanurate tri(meth)acrylate, mono- or polyethoxylated glycerol tri(meth)acrylate, mono- or polypropoxylated glycerol tri(meth)acrylate, pentaerythritol tri(meth)acrylate, arylurethane tri(meth)acrylate, aliphatic urethane tri(meth)acrylate, melamine tri(meth)acrylate, epoxy-novolac tri(meth)acrylate, aliphatic epoxy tri(meth)acrylate, polyester tri(meth)acrylate, and mixtures thereof.

Examples of suitable tetra(meth)acrylates include, without being restricted to, di(trimethylolpropane) tetra(meth)acrylate, pentaerythritol) tetra(meth)acrylate, mono- or polyethoxylated pentaerythritol tetra(meth)acrylate, mono- or polypropoxylated pentaerythritol tetra(meth)acrylate, dipentaerythritol tetra(meth)acrylate, mono- or polyethoxylated dipentaerythritol tetra(meth)acrylate, mono- or polypropoxylated dipentaerythritol tetra(meth)acrylate, mono- or polyethoxylated dipentaerythritol tetra(meth)acrylate mono- or polypropoxylated dipentaerythritol tetra(meth)acrylate, arylurethane tetra(meth)acrylate, aliphatic urethane tetra(meth)acrylate, melamine tetra(meth)acrylate, epoxynovolac tetra(meth)acrylate, polyester tetra(meth)acrylate, and mixtures thereof.

Mixtures of the polyfunctional (meth)acrylates may also be used.

Examples of suitable Michael donors include: acetoacetates of mono- or polyethoxylated and propoxylated diols, triols and polyols, ethylene glycol diacetoacetate, 1,2-propanediol diacetoacetate, 1,3-propanediol diacetoacetate, 1,4-butanediol diacetoacetate, 1,6-hexanediol diacetoacetate, neopentyl glycol diacetoacetate, bisphenol A diacetoacetate, mono- or polyethoxylated bisphenol A diacetoacetate, isosorbide diacetoacetate, cyclohexane dimethanol diacetoacetate, 1,3-benzene dimethanol diacetoacetate (1,3-BDDA), 1,4-benzene dimethanol diacetoacetate (1,4-BDDA), trimethylol propane triacetoacetate (Lonzamon AATMP), glycerin triacetoacetate, polycaprolactone triacetoacetate, pentaerythritol tetraacetoacetate, dipentaerythritol hexaacetoacetate, glucose triacetoacetate, glucose tetraacetoacetate, glucose pentaacetoacetate, sucrose acetoacetate, sorbitol triacetoacetate, sorbitol tetraacetoacetate, mono- or polyethoxylated neopentyl glycol diacetoacetate, propoxylated glucose acetoacetate, propoxylated sorbitol acetoacetate, propoxylated sucrose acetoacetate, polyester acetoacetate, where the polyester is derived from at least one diacid and at least one diol, 1,2-ethylene bisacetoacetamide, polyester amide acetoacetate, where the polyester amide is derived from at least one diacid and at least one diamine, acetoacetate-functionalized castor oil, polyester polymer, (meth)acrylate polymer.

The Michael donor may be used alone or as a mixture of two or more different compounds.

The degree of cross-linking of the binder and thus also the strength of the coating obtained and its elastic properties may be adjusted depending on the functionality of the Michael acceptor and/or the Michael donor. At the same time, it has a direct effect on the achievable expansion of the ash crust obtained in the event of fire.

The relative proportion of multifunctional Michael acceptors to multifunctional Michael donors in the composition of the present invention may be characterized by the reactive equivalent ratio, which is the ratio of the number of all functional Michael acceptor groups having structures (I), (II), and (III) in the composition to the number of Michael-active hydrogen atoms in the composition. In some embodiments, the reactive equivalent ratio is 0.1 to 10:1; preferably 0.2 to 5:1; more preferably 0.3 to 3:1, and most preferably 0.5 to 2:1.

By using a compound containing an X—H group, preferably one in which X stands for N, P, or C as part of an acid methyl group, as component C, it is possible to provide an adjustable reactivity profile, which has an initial induction phase having a reduced reaction rate directly after mixing and activating the composition, followed by an increase in reactivity after the components of the composition have been mixed for a longer time. This induction time may be set to provide an extended "open time," in which the composition remains sufficiently liquid for being processed. Furthermore, a longer open time makes it possible for the solvent contained in the composition or the air bubbles present in the coating to escape. The induction phase allows the system to remain liquid for a longer period of time and to level. Surface defects, which often occur in the event of (excessively) rapid curing of the composition, may thus be minimized.

By adjusting the period of time over which the solvents possibly present in the composition may evaporate, the hardness of the cured compositions may be influenced. After the induction phase, the composition behaves as a similar composition without component C and cures accordingly.

The components of the composition form an acid-base equilibrium system. The reactivity profile of the composition results from the selection of the suitable pKa values of the acid components B and C in the composition, which contribute to the acid-base equilibrium and the reactivity of the deprotonated form of the components vis-à-vis component A.

The pKa values of selected components B or C are listed below:

| | |
|---|---|
| Benzotriazol | 8.2 |
| Acetylacetone | 9.0 |
| Ethosuximide | 9.3 |
| 1,2,3-triazol | 9.4 |
| Succinimide | 9.5 |
| 4-nitro-2-methylimidazol | 9.6 |
| Uracil | 9.9 |
| Phenol | 10.0 |
| Benzene sulfonamide | 10.1 |
| 5,5-dimethylhydantoin | 10.2 |
| 1,2,4-triazol | 10.2 |
| Nitromethane | 10.2 |
| Isatin | 10.3 |
| Ethyl acetoacetate | 10.7 |
| Diethyl malonate | 13.0 |

The X—H group has a higher acidity than the acid C—H group of component B. Component C preferably has a pKa (determined in an aqueous medium) that is at least one integer unit, preferably two integer units, less than the pKa of component B. In particular, the pKa of component C is less than 13, preferably less than 12, more preferably less than 11, and even more preferably less than 10. At a higher acidity, problems occur with the catalyst. Therefore, the pKa of the component is preferably greater than 7, more preferably greater than 8. The differences in the pKa values of components B and C ensure that, when the composition is used, component C is activated, i.e., deprotonated, preferably before component D.

In a Michael reaction, component C has preferably a reactivity vis-à-vis component A, which is such that in a composition where also the acid C—H groups of component B are present it reacts more rapidly than component B. The higher reactivity of component C results in the induction time.

In the Michael addition, component C has a reactivity compared to the acid C—H groups of component B that is lower by a factor of at least 3, preferably by a factor of at least 10, more preferably by a factor of at least 30, determined under comparable conditions, the components being reacted at room temperature, using an excess of Michael acceptors in the presence of a base, which is capable of deprotonating at least 1 mol % of the Michael donor. This is helpful for setting the induction time. If other operating temperatures are required, the relative reactivity should be determined at the adjusted temperatures in order to select suitable compounds.

In the composition according to the present invention, the X—H groups are preferably present in a proportion of at least 50 mol %, more preferably in a proportion of at least 100 mol %, most preferably in a proportion of at least 150 mol % relative to the quantity of base released by component D. Furthermore, the X—H groups are present in component C in a proportion of not more than 30 mol %, preferably of not more than 20 mol %, relative to the acid C—H groups in component B.

The suitable quantity is determined mainly by the acid-base character of component C relative to component B and the reactivity of the correspondent anion vis-à-vis component A. It may therefore vary for different systems. The open time may thus be adjusted even for very small quantities of component C. This is advantageous because the very small quantities of component C barely affect the properties of the resulting cured composition, such as the chemical and mechanical properties of a coating. Customarily the X—H groups are present in component C in a proportion that corresponds to a proportion of not more than 30 mol %, preferably not more than 20 mol % relative to the C—H groups in component B.

Suitable compounds as component C are compounds where X stands for a carbon atom (C), and the carbon atom is part of an acid methyl group, nitromethane being preferred. In other preferred compounds having an X—H group, X stands for an oxygen atom (O), an aromatic hydroxyl group being preferred.

Preferred compounds are acid aza compounds in which X stands for a nitrogen atom (N), the N—H group being preferably part of an Ar—NH—(C=O)—, —(C=O)—NH—(C=O)—, or —NH—(O=S=O) group or a heterocycle, where the nitrogen atom of the N—H group is a component of the ring system. More preferably, the compound is an imide derivative, preferably a cyclic imide derivative, more preferably a possibly substituted succinimide or glutarimide. Substituted succinimide ethosuximide may be mentioned as an example.

Other suitable compounds in which X stands for a nitrogen atom are hydantoin derivatives such as 5,5-dimethyl-hydantoin, sulfonamides such as aromatic sulfonamides, for example, benzene or toluene sulfonamide or heterocyclic compounds having an N—H group, preferably a possibly substituted triazol, pyrazol, or imidazol, in particular, 1,2,4-triazole, benzotriazol, or 2-methyl-4-nitroimidazol or a uracil derivative.

Component C may be present in a deprotonated form (in an acid-base equilibrium with other components).

The quantities mentioned here refer to both the neutral and the deprotonated forms. This means that when component C is present in a quantity of more than 100% relative to a basic catalyst, component C and the catalyst may be in equilibrium, so that the deprotonated form of component C is present as the dominating species, which initiates the curing of the composition, rather than component D as basic species and component C as acid species. Preferably the X—H functionality, i.e., the number of X—H groups per molecule of component C is low, preferably less than 4, more preferably less than 2, most preferably it is 1.

Component C may contain one or more different compounds having at least one X—H group.

The composition may include, in addition to component C, another component B2, which contains acid protons (C—H) in activated methylene or methine groups, has higher acidity than component B, and may react with component A. Compound B2 may contribute to the effect of influencing the open time. To do so, component B2 should preferably be contained in a proportion between 10 and 40 wt. %, which is substantially more than that of component C. In the composition, the C—H groups in component B2 are contained in a proportion between 1 and 50 mol %, preferably between 5 and 40 mol % relative to the total proportion of C—H groups in component B.

Component B2 preferably has a structure Y—C(=O)—CHR—C(=O)—Y', where R stands for hydrogen or an alkyl, aralkyl, or aryl group, and Y and Y' may be identical or different and stand for different substituent groups, in particular, alkyl, aralkyl, or aryl groups (R*), alkoxy groups (—OR*), or a polymeric basic skeleton, or where the —C(=O)—Y and/or —C(=O)—Y' unit is replaced by CN or phenyl.

Component C and, if present in the composition, component B2 are to be taken into account in the above-mentioned reactive equivalent ratio, which is the ratio of the number of all functional Michael acceptor groups in the composition to the number of Michael-active hydrogen atoms in the composition.

The difference in the acidities of the two C—H acid components B and B2 is selected so that the pKa of component B2 is between 0.5 and 6, preferably between 1 and 5, and more preferably between 1.5 and 4 units less than the pKa of component B.

The reaction between the Michael acceptor and the Michael donor occurs in the presence of a catalyst (component D). The bases customarily used for Michael addition reactions, possibly in combination with a suitable phase transfer catalyst, nucleophile or phosphine, which are known to those skilled in the art, may be used as catalysts. Furthermore, quaternary ammonium carbonates, ammonium bicarbonates, phosphonium carbonates and phosphonium bicarbonates may be used as catalysts.

Suitable bases are: tertiary amines such as triethylamine, ethyl-N,N-diisopropylamine, 1,4-diazabicyclo[2.2.2]octane (DABCO); "blocked" bases such as formiate salts of amine or amidine bases; amidine bases such as 1,8-diazabicyclo[5.4.0]undec-7-ene (DBU), and 1,5-diazabicyclo[4.3.0]non-5-ene (DBN); guanidine bases such as tetramethyl guanidine (TMG) and 1,5,7-triazabicyclo[4.4.0]dec-5-ene (TBD); inorganic bases such as potassium carbonate, potassium bicarbonate, phosphates and hydrogen phosphates; quaternary ammonium hydroxides such as benzyltrimethylammonium hydroxide and tetrabutylammonium hydroxide (TBAH); proton sponge such as 1,8-bis(dimethylamino)naphtalene; pyridine bases such as 2,6-di-tert-butylpyridine, 2,6-lutidine and dimethylaminopyridine (DMAP); carboxylic acid salts such as sodium or potassium salts of carboxylic acids, for example, acetates, alcoholates such as sodium methanolate, potassium methanolate, sodium ethanolate, potassium ethanolate, and potassium-tert-butylalcoholate.

Suitable phase transfer catalysts are: quaternary ammonium or phosphonium compounds such as methyltrioctylammonium chloride, benzyltrimethylammonium chloride, hexadecyltributylphosphonium bromide, tetra-n-butylammonium chloride, and tetra-n-butylammonium bromide. The catalysis of Michael addition reactions by phase transfer catalysts is described, for example, in E. Diez-Barra, A. de la Hoz, S. Merino, A. Rodriguez, P. Sánchez-Verdui, *Tetrahedron* 1998, 54, 1835.

Suitable nucleophiles are: primary or secondary alkylamines such as n-pentylamine and di-n-propylamine.

Suitable phosphines are: tertiary phosphines such as tri-n-propylphosphine, tri-n-butylphosphine, tri-n-octylphosphine, dimethylphenylphosphine, methyldiphenylphosphine or triphenylphosphine, such as described, for example, in J. W. Chan, C. E. Hoyle, A. B. Lowe, M. Bowman, *Macromolecules* 2010, 43, 6381-6388. In this respect, further reference is made to WO 2010/030771 A1, whose content is incorporated herein.

Suitable quaternary ammonium carbonates or phosphonium carbonates are: tetramethylammonium methyl carbonate, tetramethylammonium ethyl carbonate, tetrabutylammonium methyl carbonate, tetrabutylammonium ethyl carbonate, tetrahexylammonium methyl carbonate, tetrahexylammonium ethyl carbonate, tetraoctylammonium methyl carbonate, tetraoctylammonium ethyl carbonate, tetradecylammonium methyl carbonate, tetradecylammonium ethyl carbonate, hexadecyltrimethylammonium methyl carbonate, hexadecyl-trimethylammonium ethyl carbonate, benzyltrimethylammonium methyl carbonate, benzyltrimethylammonium ethyl carbonate, tetrabutylammonium bicarbonate, tetrahexylammonium bicarbonate, benzyltrimethylammonium bicarbonate, tetrabutylphosphonium methyl carbonate. Catalysts of this type are described, for example, in M. Fabris, V. Lucchini, M. Noe, A. Perosa, M. Selva, *Chem. Eur. J.* 2009, 15, 12273 and M. Fabris, M. Noe, A. Perosa, M. Selva, R. Ballini, *J. Org. Chem.* 2012, 77, 1805. In this respect, further reference is made to WO 11/124663 A and WO 11/055463 A, whose contents are incorporated herein.

The catalyst may be used in catalytic quantities or in equimolar quantities or in excess.

Although the Michael acceptor and the Michael donor may react in the absence of a solvent, sometimes it is necessary to change and/or adjust the effectiveness of the conversion or the viscosity of the components, in particular, of the Michael acceptor.

Preferably a low-viscosity solvent is used, which participates in the reaction and is incorporated in the binder, known as a reactive thinner. Suitable reactive thinners are the Michael acceptors themselves having at least one functional Michael acceptor group, which may be monomers or oligomers, preferably monomers, and may have the above-mentioned suitable skeleton.

According to the present invention, component E contains an insulation layer-forming additive; the additive may include individual compounds or a mixture of a plurality of compounds.

Advantageously, additives that form a swelling, insulating layer made of a material having low flammability at impact of heat are used as insulation layer-forming additives. This layer protects the substrate from overheating and thus prevents or at least delays the change in mechanical and static properties of load-bearing components under the effect of heat. The formation of a voluminous insulating layer, namely an ash layer, may be achieved via a chemical reaction of a mixture of compounds adjusted to each other, which react with each other under the impact of heat. Such systems are known to those skilled in the art by the term chemically intumescent systems and may be used according to the present invention. As an alternative, the voluminous insulating layer may be formed via physical intumescence. Both systems may be used according to the present invention alone or in combination.

For forming an intumescent layer by chemical intumescence, in general at least three components are needed: one carbon source, one dehydration catalyst, and one propellant, which are contained, for example, in a binder in the case of coatings. When heated, the binder softens and the fire protection additives are released, so that in the case of chemical intumescence they may react with each other or, in the case of physical intumescence, they may swell. The acid acting as a catalyst for the carbonization of the carbon sources is formed from the dehydration catalyst by thermal decomposition. At the same time, the propellant is thermally decomposed forming inert gases, which causes swelling of the carbonized material and possibly the softened binder, forming a voluminous insulating foam.

In one specific embodiment of the invention, in which the insulating layer is formed by chemical intumescence, the insulation layer-forming additive includes at least one carbon skeleton builder if the binder cannot be used as such, at least one acid former, at least one propellant, and at least one inorganic skeleton builder. The components of the additive are selected in particular, so that they may develop synergism; some of the compounds may perform a plurality of functions.

The compounds customarily used in intumescent fire protection formulations and known to those skilled in the art may be considered as carbon sources, such as starch-like compounds, for example, starch and modified starch and/or polyvalent alcohols (polyols) such as saccharides, oligosaccharides, and polysaccharides and/or a thermoplastic or duroplastic polymer resin binder such as a phenol resin, a urea resin, a polyurethane, polyvinyl chloride, poly(meth) acrylate, polyvinyl acetate, polyvinyl alcohol, a silicone resin and/or a rubber. Suitable polyols are polyols of the group sugar, pentaerythrite, dipentaerythrite, tripentaerythrite, polyvinyl acetate, polyvinyl alcohol, sorbitol, and EO-PO-Polyols. Preferably pentaerythrite, dipentaerythrite, or polyvinyl acetate are used.

It should be mentioned that the binder itself may also have the function of a carbon source in the event of fire.

The compounds customarily used in intumescent fire protection formulations and known to those skilled in the art may be considered as dehydration catalysts or acid formers, such as a salt or an ester of an inorganic, non-volatile acid, selected among sulfuric acid, phosphoric acid, or boric acid. Essentially wide-range phosphorus-containing compounds are selected, since they extend over a plurality of oxidation levels of phosphorus such as phosphines, phosphinoxides, phosphonium compounds, phosphates, elementary red phosphorus, phosphites, and phosphates. As phosphoric acid compounds, the following may be named as examples: monoammonium phosphate, diammonium phosphate, ammonium phosphate, ammonium polyphosphate, melamine phosphate, melamine resin phosphates, potassium phosphate, polyol phosphates such as pentaerythrite phosphate, glycerin phosphate, sorbitol phosphate, mannite phosphate, dulcite phosphate, neopentylglykol phosphate, ethylenglykol phosphate, dipentaerythrite phosphate and the like. As phosphoric acid compound, preferably a polyphosphate or an ammonium polyphosphate is used. Melamine resin phosphates are understood as compounds such as the reaction products of Lamelite C (melamine-formaldehyde resin) with phosphoric acid. The following may be mentioned as sulfuric acid compounds: ammonium sulfate, ammonium sulfamate, nitroanilin bisulfate, 4-nitroanilin-2-sulfonic acid and 4,4-dinitrosulfanil amide and the like. As boric acid compound, melamine borate may be mentioned as an example.

Compounds customarily used in fire protection formulations and known to those skilled in the art may be considered as propellants, such as cyanuric acid or isocyanic acid and their derivatives, melamine and its derivatives, such as cyanamide, dicyanamide, dicyandiamide, guanidine and its salts, biguanide, melamine cyanurate, cyanic acid salts, cyanic acid esters and cyanic acid amides, hexamethoxymethylmelamine, dimelamine pyrophosphate, melamine polyphosphate, melamine phosphate. Preferably hexamethoxymethylmelamine or melamine (cyanuric acid amine) are used.

Furthermore, components whose action is not limited to a single function, such as melamine polyphosphate, which acts both as acid former and as propellant are suitable. Further examples are described in GB 2 007 689 A1, EP 139 401 A1, and U.S. Pat. No. 3,969,291 A1.

In one specific embodiment of the invention, in which the insulating layer is formed by physical intumescence, the insulation layer-forming additive includes at least one thermally expandable compound such as a graphite intercalation compound, which is also known as expandable graphite. These may also be included in binders.

Known intercalation compounds of $SO_x$, $NO_x$, halogen and/or acids in graphite may be considered as expandable graphite. They are also known as graphite salts. Preferred are expandable graphites that release $SO_2$, $SO_3$. NO, and/or $NO_2$ while expanding at temperatures of 120° C. to 350° C., for example. Expandable graphite may be present in the form of platelets having a maximum diameter in the range of 0.1 mm to 5 mm. This diameter is preferably in the range of 0.5 mm to 3 mm. Expandable graphites suitable for the present invention are commercially available. In general, the expandable graphite particles are uniformly distributed in the composition according to the present invention. However, the concentration of expandable graphite particles may also be punctiform, patterned, flat, and/or sandwich-like. In this respect, reference is made to EP 1489136 A1, whose content is incorporated herein.

Since the ash crust formed in the event of fire is sometimes too unstable and therefore, depending on its thickness and structure, may be blown away by air currents, which has a negative effect on the insulating effect of the coating, at least one ash crust stabilizer may be added to the above-mentioned components.

Compounds customarily used in fire protection formulations and known to those skilled in the art may be considered as ash crust stabilizers or skeleton builders, for example, expandable graphite and particulate metals such as aluminum, magnesium, iron, and zinc. The particulate metal may be present in the form of a powder, platelets, scales, fibers, strings, and/or whiskers, the particulate metal in the form of powder, platelets or scales having a particle size of ≤50 μm, preferably of 0.5 μm to 10 μm. When the particulate metal is used in the form of fibers, strings, and/or whiskers, a thickness of 0.5 μm to 10 μm and a length of 10 μm to 50 μm is preferred. Alternatively or additionally, an oxide or a compound of a metal of the group that includes aluminum, magnesium, iron, or zinc may be used as ash crust stabilizers, in particular, iron oxide, preferably iron trioxide, titanium dioxide, a borate such as zinc borate and/or a glass frit of low-melting glasses preferably having a melting point of 400° C. or higher, phosphate glasses or sulfate glasses, melamine polyzinc sulfates, ferro glasses, or calcium borosilicates. The addition of such an ash crust stabilizer contributes to considerably stabilizing the ash crust in the event of fire, since these additives enhance the mechanical strength of the tumescent layer and/or prevent them from dripping off. Examples of such additives are also found in U.S. Pat. No. 4,442,157 A, U.S. Pat. No. 3,562,197 A, GB 755 551 A and EP 138 546 A1.

Ash crust stabilizers such as melamine phosphate or melamine borate may also be contained.

Optionally, one or more reactive flame inhibitors may be added to the composition according to the present invention. Compounds of this type are built into the binder. One example in the sense of the invention are reactive organo-phosphorous compounds such as 9,10-dihydro-9-oxa-10-phosphaphenanthrene-10-oxide (DOPO) and its derivatives and adducts. Such compounds are described in S. V Levchik, E. D Weil, *Polym. Int.* 2004, 53, 1901-1929 or E. D. Weil, S. V. Levchik (publ.), Flame Retardants for Plastics and Textiles—Practical Applications, Hanser, 2009, whose contents are incorporated herein.

The insulation layer-forming additive may be contained in the composition in a quantity of 30 to 99 wt. %, the quantity essentially depending on the form of application of the composition (spraying, brushing and the like). In order to achieve the highest possible intumescence rate, the proportion of component E in the total composition is adjusted to be as high as possible. Preferably the proportion of component E in the total composition is 35 to 85 wt. %, more preferably 40 to 85 wt. %.

In addition to the insulation layer-forming additives, the composition may possibly contain other customary additives such as cross-linking agents, for example, on the basis of polyacrylates and/or polyphosphates, defoaming agents such as silicone-based defoaming agents, thickeners such as alginate thickeners, colorants, fungicides, softeners such as chlorine-containing waxes, binders, flame inhibitors, or various fillers such as vermiculite, inorganic fibers, quartz sand, micro-glass beads, mica, silicon oxide, mineral wool and the like.

Additional additives such as thickeners, rheology additives, and fillers may be added to the composition. Preferably polyhydroxycarboxylic acid amines, urea derivatives, salts of unsaturated carboxylic acid esters, alkylammonium salts of acid phosphoric acid derivatives, ketoximes, amine salts of p-toluenesulfonic acid, amine salts of sulfonic acid derivatives or aqueous or organic solutions or mixtures of compounds are used as rheology additives such as suspension agents, anti-runoff agents, thixotropic agents. In addition, rheology additives on the basis of pyrogenic or precipitated silica or on the basis of silanized pyrogenic or precipitated silica may be used. Preferably the rheology additive is a pyrogenic silica, modified and unmodified layered silicates, precipitated silicas, cellulose ethers, polysaccharides, PU thickeners and acrylate thickeners, urea derivatives, castor oil derivatives, polyamides and fatty acid amides and polyolefines as long as they are in the solid form, pulverized cellulose and/or suspension agents such as, for example, xanthan gum.

The composition according to the present invention may be prepared as a two- or multicomponent system.

When component A and component B do not react at room temperature without a catalyst, these may be stored together. If a reaction occurs at room temperature, component A and component B must be kept separate to inhibit a reaction. In the presence of a catalyst, this must be stored separate from component B. If the catalyst, by its nature, reacts with component A, it must be stored separate from both components. Those skilled in the art recognize or may easily find out which catalyst is suitable for yielding a component storable together with component A. In general, it is important to mix components A and B of the binder and the catalyst only immediately before use, thus initiating the curing reaction.

Component C may be stored together with components A and B or component D. If components A, B, and C are stored together, it is preferred that the X—H group of component C not be excessively reactive vis-à-vis component A in the absence of the catalyst in order to increase the storage stability. Accordingly, it is preferred that component C have such a reactivity with component A without a catalyst in a Michael addition that its half-life at room temperature is greater than 30 minutes, preferably greater than 1 hour, more preferably greater than two hours, even more preferably greater than four hours, even more preferably greater than 24 hours, and most preferably greater than 72 hours, measured in butyl acetate.

Component E may be contained in one component or in more components as a mixture or divided into individual components. Component E is divided depending on the compatibility of the compounds contained in the composition, so that neither a reaction of the compounds contained in the composition nor mutual interference may take place. This depends on the compounds used. It is thus ensured that the highest possible proportion of fillers is achieved, resulting in high intumescence, even for reduced layer thickness of the composition.

If at least one ash crust stabilizer is contained in the composition, it may be contained in one component of the two-component or multicomponent system. Alternatively, it may be divided in a suitable manner into the at least two components.

The composition is applied to the substrate, in particular, a metallic substrate, as a paste using a brush, a roller, or by spraying. The composition is preferably applied by an airless spray method.

The composition according to the present invention is characterized, compared to the solvent-based and water-based systems, by relatively fast curing due to an addition reaction and thus the unnecessary physical drying. This is very important in particular, when the coated building components must be rapidly subjected to load or further processed, either by coating using a cover layer or by moving or transporting. Coating is therefore less sensitive to external influences on the construction site, such as exposure to (rain)water or dust and dirt, which, in solvent-based or water-based systems may result in water-soluble components such as ammonium polyphosphate being washed out or in reduced intumescence caused by dust. Due to the low viscosity of the composition despite its high solids content, which, without adding volatile solvents may amount to 99 wt. % in the composition, the composition remains easy to process, in particular, by the usual spray method. Due to the low softening point of the binder and to the high solids content, the expansion rate under the effect of heat is high even in the case or reduced layer thickness, the intumescence factor being in the range of 5 to 50 times the thickness of a coating. The ash crust formed in the event of fire is extremely hard and stable and is in the range of 0.50 to 0.99 measured according to the method mentioned below.

Therefore, the composition according to the present invention is suitable as fire protection coating, in particular, sprayable coating for metal-based or non-metal-based building components, in particular, for steel components and timber components.

The composition according to the present invention is used mainly in the construction industry as coating, in particular, fire protection coating, for steel construction elements, but also for construction elements made of other materials such as concrete or timber, as well as fire protection coating for individual cables, cable bundles, cable routes, and cable channels or cable lines.

Another subject matter of the invention is therefore the use of the composition according to the present invention as coating, in particular, as coating for construction elements made of steel, concrete, timber, and other materials, such as plastics, or as coating for individual cables, cable bundles, cable routes, and cable channels or other lines, in particular, as fire protection coating.

The following examples are given to further elucidate the present invention.

EXEMPLARY EMBODIMENTS

The components that are listed below are used for producing the insulation layer-forming compositions according to the present invention. The individual components are diluted using a solvent and homogenized. These mixtures are then mixed for use prior to or, preferably during, spraying and applied.

The curing behavior of the composition is monitored, and the intumescence factor and the relative ash crust stability are then determined. For this purpose, the mass is provided in a round, 2 mm deep teflon form having a 48 mm diameter.

The curing time corresponds to the time after which the samples are fully hardened and can be removed from the teflon form.

For determining the intumescence factor and the relative ash crust stability, a muffle oven is preheated to 600° C. The thickness of the sample is measured multiple times using a caliper and the mean value $h_M$ is calculated. The samples are then inserted into a cylindrical steel form and heated in the muffle oven for 30 min. After cooling to room temperature, the foam height $h_{E1}$ is initially determined destruction-free (mean value of the multiple measurements). The intumescence factor is determined by the formula:

Intumescence factor $I: I = h_{E1} : h_M$

A defined weight is then dropped in the cylindrical steel form (m=105 g) onto the foam from a defined height (h=100 mm) and the foam height $h_{E2}$ remaining after this partially destructive action is determined. The relative ash crust stability is determined by the formula:

Relative ash crust stability (AKS): $AKS = h_{E2} : h_{E1}$

For the following examples 1 through 8 and comparative examples 2 and 3, the following composition is used as component E and the composition is used in the given quantities:

Component E:

| Component | Qty [g] |
|---|---|
| Pentaerythrite | 8.7 |
| Melamine | 8.7 |
| Ammonium polyphosphate | 16.6 |
| Titanium dioxide | 7.9 |

Example 1

Component A with D

| Component | Qty [g] |
|---|---|
| TMPTA[1] | 11.9 |
| DBU[2] | 0.56 |

[1]Trimethylol propane triacrilate
[2]1,8-diazabicyclo[5.4.0]undec-7-ene

Component B

| Component | Qty [g] |
|---|---|
| Trimethylolpropane triacetoacetate[3] | 15.5 |

[3]Lonzamon AATMP

Component E

| Component | Qty [g] |
|---|---|
| As above | 42.0 |

To produce a two-component system, component E is divided into components A, containing component D, and B.

Example 2

Component A with D

| Component | Qty [g] |
|---|---|
| TMPTA | 16.6 |
| DBU | 0.56 |

Component B

| Component | Qty [g] |
|---|---|
| Trimethylolpropane triacetoacetate | 10.8 |

Component E

| Component | Qty [g] |
|---|---|
| As above | 42.0 |

To produce a two-component system, component E is divided into components A, containing component D, and B.

Example 3

Component A with D

| Component | Qty [g] |
|---|---|
| Pentaerythritol triacrylate | 12.0 |
| DBU | 0.56 |

Component B

| Component | Qty [g] |
|---|---|
| Trimethylolpropane triacetoacetate[3] | 15.5 |

[3]Lonzamon AATMP

Component E

| Component | Qty [g] |
|---|---|
| As above | 42.0 |

To produce a two-component system, component E is divided into components A, containing component D, and B.

Example 4

Component A with D

| Component | Qty [g] |
|---|---|
| Pentaerythritol triacrylate | 16.7 |
| DBU | 0.56 |

Component B

| Component | Qty [g] |
|---|---|
| Trimethylolpropane triacetoacetate[3] | 10.8 |

[3]Lonzamon AATMP

Component E

| Component | Qty [g] |
|---|---|
| As above | 42.0 |

To produce a two-component system, component E is divided into components A, containing component D, and B.

Example 5

Component A with D

| Component | Qty [g] |
|---|---|
| Propoxylated glycerol triacrylate | 14.4 |
| DBU | 0.7 |

Component B

| Component | Qty [g] |
|---|---|
| Trimethylolpropane triacetoacetate[3] | 13.0 |

[3]Lonzamon AATMP

Component E

| Component | Qty [g] |
|---|---|
| As above | 42.0 |

To produce a two-component system, component E is divided into components A, containing component D, and B.

Example 6

Component A with D

| Component | Qty [g] |
|---|---|
| Propoxylated glycerol triacrylate | 18.8 |
| DBU | 0.7 |

Component B

| Component | Qty [g] |
|---|---|
| Trimethylolpropane triacetoacetate[3] | 8.5 |

[3]Lonzamon AATMP

Component E

| Component | Qty [g] |
|---|---|
| As above | 42.0 |

To produce a two-component system, component E is divided into components A, containing component D, and B.

Example 7

Component A

| Component | Qty [g] |
|---|---|
| TMPTA[1] | 8.3 |

[1]trimethylolpropane triacrylate

Component B with D

| Component | Qty [g] |
|---|---|
| Trimethylolpropane triacetoacetate[2] | 10.8 |
| $K_2CO_3$ | 1.0 |

[2]Lonzamon AATMP

Component E

| Component | Qty [g] |
|---|---|
| As above | 30.0 |

To produce a two-component system, component E is divided into components A and B, containing component D.

Example 8

Component A

| Component | Qty [g] |
|---|---|
| TMPTA[1] | 10.2 |

[1]trimethylolpropane triacrylate

Component B with D

| Component | Qty [g] |
|---|---|
| Trimethylolpropane triacetoacetate[2] | 8.8 |
| $K_2CO_3$ | 1.0 |

[2]Lonzamon AATMP

Component E

| Component | Qty [g] |
|---|---|
| As above | 30.0 |

To produce a two-component system, component E is divided into components A and B, containing component D. The shrinkage for all compositions was less than 5.0%.

Comparative Example 1

A commercially available fire protection product (Hilti CFP S-WB) based on aqueous dispersion technology was used for comparison.

Comparative Example 2

A standard epoxy-amine system (Jeffamine® T-403, a liquid, solvent-free and crystallization-stable epoxy resin, composed of low-molecular, bisphenol A and bisphenol F-based epoxy resins (Epilox® AF 18-30, Leuna-Harze GmbH) and 1,6-hexanediol diglycidyl ether)), 60% supplemented with an intumescence mixture as in the above examples, was used for further comparison and tested.

Comparative Example 3

A standard epoxy-amine system (isophorondiamine trimethylolpropane triacrylate and a liquid, solvent-free and crystallization-stable epoxy resin, composed of low-molecular, bisphenol A and bisphenol F-based epoxy resins (Epilox® AF 18-30, Leuna-Harze GmbH)), 60% supplemented with an intumescence mixture as in the above examples, was used for further comparison and tested.

Table 1 shows that the relative ash crust stability for the same proportion of insulation layer-forming additive is substantially higher than that of Comparative Example 2 (epoxy-amine system). The curing times were also substantially reduced compared to the comparative systems and amounted to one to three hours.

TABLE 1

Results of the measurements of the intumescence factor, the ash crust stability, and the curing time

| Example | Intumescence Factor I (multiple) | Relative Ash Crust Stability AKS (multiple) | Sample Thickness $h_M$ (mm) | Curing time (hr) |
|---|---|---|---|---|
| 1 | 16 | 0.92 | 3.2 | 1 |
| 2 | 9 | 0.8 | 2.8 | 1 |
| 3 | 26 | 0.97 | 2.8 | 2 |
| 4 | 29 | 0.95 | 2.8 | 2 |
| 5 | 12 | 0.97 | 2.8 | 2.5 |
| 6 | 9 | 0.88 | 2.6 | 2.5 |
| 7 | 25 | 0.97 | 1.9 | 1 |
| 8 | 37 | 0.84 | 1.8 | 0.5 |
| Comparative Example 1 | 36 | 0.62 | 1.8 | 10 days |
| Comparative Example 2 | 22 | 0.04 | 1.6 | 12 hrs |
| Comparative Example 3 | 1.7 | 0.60 | 1.2 | 1 day |

What is claimed is:

1. An insulation layer-forming composition comprising:
   a component A containing a multifunctional Michael acceptor, the Michael acceptor having at least two electron-deficient multiple carbon bonds per molecule as functional Michael acceptor groups,
   a component B containing a multifunctional Michael donor, the Michael donor having at least two C,H acid groups per molecule as functional Michael donor groups,
   a component C containing a compound having an X—H group, the compound being capable of reacting with component A and X standing for N, P, O, S, or C, with the provision that, when X stands for C, C is part of an acid methyl group,
   a component D containing a catalyst for a Michael addition reaction, and
   a component E containing an insulation layer-forming additive.

2. The composition as recited in claim 1 wherein the functional Michael acceptor groups have structure (I) or (II):

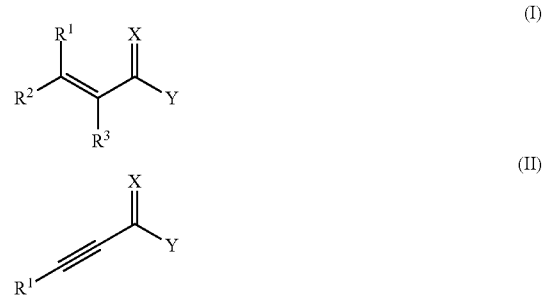

where
R$^1$, R$^2$, and R$^3$ represent, independently of each other, hydrogen, a linear, branched, or cyclic, possibly substituted alkyl group, aryl group, aralkyl group, or alkylaryl group; which may contain, independently of each other, additional ether groups, carboxyl groups, carbonyl groups, thiol analog groups, nitrogen-containing groups, or combinations thereof; X represents O, S, or NR$^4$, where R$^4$ represents hydrogen or any of the organic groups as described for R$^1$, R$^2$, and R$^3$; Y represents OR$^5$, SR$^5$, or NR$^5$R$^6$, where R$^5$ and R$^6$ represent hydrogen or any of the organic groups as described above for R$^1$, R$^2$, and R$^3$.

3. The composition as recited in claim 2 wherein each functional Michael acceptor group is connected to another functional Michael acceptor group, which may be identical or different, or a skeleton via one or more of R$^1$, R$^2$, R$^3$, R$^4$, R$^5$, or R$^6$.

4. The composition as recited in claim 3 wherein the functional Michael acceptor groups are connected to a polyol compound, an oligomer or polymer via R$^4$, R$^5$, or R$^6$.

5. The composition as recited in claim 1 wherein the functional Michael donor groups are selected from the group consisting of β-ketoesters, β-ketoamides, 1,3-diketons, malonic esters and malonic ester derivatives, cyanoacetate esters, cyanoacetamides, and α-nitroalkanes.

6. The composition as recited in claim 1 wherein the functional Michael acceptor groups or the functional Michael donor groups are connected, independently of each other, to a polyol group selected from the group consisting of: pentaerythriol, neopentyl glycol, glycerol, trimethylol propane, ethylene glycol, and polyethylene glycols, propylene glycols, and polypropylene glycols, butanediol, pentanediol, hexanediol, tricyclodecane dimethylol, 2,2,4-trimethyl-1,3-pentanediol, bisphenol A, cyclohexane dimethanol, alkoxylated and/or propoxylated derivatives of neopentyl glycol and tetraethylene glycol.

7. The composition as recited in claim 1 wherein the X—H group of component C is characterized by a pKa (determined in aqueous medium) less by an integer unit than a further pKa of dominant C—H groups in component B.

8. The composition as recited in claim 1 wherein the X—H groups in component C are contained in a proportion of at least 50 mol % relative to quantity of base which is released by component D.

9. The composition as recited in claim 1 wherein the X—H groups in component C are contained in a proportion no greater than 30 mol % relative to the C—H acid groups of component B.

10. The composition as recited in claim 1 wherein, in addition to component C, another component B2 is present and contains a further compound having acid protons (C—H) in an activated methylene group or methine group, the further compound having a higher acidity compared with component B and is capable of reacting with component A.

11. The composition as recited in claim 10 wherein the C—H groups in component B2 are contained in a proportion between 1 and 50 mol % relative to the total C—H groups in component B.

12. The composition as recited in claim 1 wherein the reactive equivalent ratio is in the range of 0.1:1 to 10:1.

13. The composition as recited in claim 1 wherein the insulation layer-forming additive is a mixture and/or includes at least one thermally expandable compound.

14. The composition as recited in claim 13 wherein the mixture includes at least one carbon source, at least one dehydration catalyst, and at least one propellant.

15. The composition as recited in claim 13 wherein the insulation layer-forming additive also contains an ash crust stabilizer.

16. The composition as recited in claim 1 wherein the composition contains additional organic and/or inorganic substances and/or other additives.

17. The composition as recited in claim 1 wherein the composition is a two-component or multicomponent system.

18. The composition as recited in claim 1 wherein the insulation layer-forming additive is contained in one component or multiple components as a mixture or divided into individual components.

19. The composition as recited in claim 18 wherein the insulation layer-forming additive also contains an ash crust stabilizer and wherein the ash crust stabilizer is contained in one component or distributed to the components.

20. A method for using of the composition as recited in claim 1 comprising applying the composition as a coating.

21. A method for using of the composition as recited in claim 1 comprising coating steel construction elements or non-metallic building components with the composition.

22. A method for using of the composition as recited in claim 1 comprising coating individual cables, cable bundles, cable routes, cable channels, or other lines with the composition.

23. A method for using of the composition as recited in claim 1 comprising applying the composition as fire protection coating.

* * * * *